United States Patent [19]
Grassberger

[11] Patent Number: 5,927,333
[45] Date of Patent: Jul. 27, 1999

[54] BALL VALVE CARTRIDGE FOR A MIXING VALVE

[75] Inventor: Roland Grassberger, Brussels, Belgium

[73] Assignee: Masco Corporation, Taylor, Mich.

[21] Appl. No.: 09/051,402

[22] PCT Filed: Jun. 7, 1996

[86] PCT No.: PCT/US96/09584

§ 371 Date: Apr. 6, 1998

§ 102(e) Date: Apr. 6, 1998

[87] PCT Pub. No.: WO97/17559

PCT Pub. Date: May 15, 1997

[30] Foreign Application Priority Data

Nov. 10, 1995 [DE] Germany .......................... 195 41 917

[51] Int. Cl.[6] .................................................. F16K 11/076
[52] U.S. Cl. .................................. 137/625.41; 137/625.46
[58] Field of Search ........................... 137/625.41, 625.46

[56] References Cited

U.S. PATENT DOCUMENTS 4,932,433  6/1990  Knapp .
5,477,885  12/1995  Knapp .
5,507,314  4/1996  Knapp .

*Primary Examiner*—John Fox
*Attorney, Agent, or Firm*—Reising, Ethington, Barnes, Kisselle et al

[57] ABSTRACT

A mixer valve (10) includes cartridge (30) that houses a ball valve element (24). The cartridge includes a lower housing member (32) affixed to an upper housing member (34) by a pin (66) which also engages the ball valve (24) to constrain its motion in two independent directions.

18 Claims, 6 Drawing Sheets

BALL VALVE CARTRIDGE FOR A MIXING VALVE

TECHNICAL FIELD

The field of this invention relates to a mixer valve for a faucet incorporating a movable ball valve element housed in an assembled cartridge.

BACKGROUND OF THE DISCLOSURE

Single handle faucets, commonly referred to as mixer valves, that control both hot and cold water flow have seen vast consumer acceptance. These faucets are commonly constructed such that a handle or knob is movable in two distinct directions to adjust the mix of hot and cold water and to adjust the volume or flow rate.

Ball valves offer reliable compact constructions that are durable. Recently, ball valves have been devised that allow the handle to be operated in the same fashion as the commercially accepted plate type mixer valve. This construction allows motion to the handle in two desirable directions most universally accepted by consumers. The desirable handle motion allows for an orbiting motion of the handle about a fixed longitudinal axis of the valve body and a rocking, i.e. pivoting, motion about a movable horizontal axis relative to the valve body. The horizontal axis is perpendicular to the longitudinal axis of the valve body and is fixed with respect to the handle such that it moves about the housing as the handle rotates about the fixed longitudinal axis. The one distinguishing characteristic of this type of handle motion is that when the handle is pivoted to an off position, the desired mix ratio of hot and cold water can be remembered by the location of the handle so that when the faucet is turned back on, the same mix of hot and cold water flows through the faucet.

One such ball valve mixing valve is disclosed in PCT publication WO 92/22765 published on Dec. 23, 1992 which incorporates a horizontal pin extending through the ball valve to position the ball in the housing. This construction virtually eliminates the floating or spongy feeling during operation of the ball valve faucet.

On the other hand, alternative types of ball drive mechanisms may be desirable in certain situations. These alternative types of ball drive mechanisms have the fixed axis of rotation being transverse to the longitudinal axis of the faucet body i.e. horizontal on many lavatory faucets. One ball valve drive mechanism has the movable axis that is fixed relative to the ball being substantially perpendicular to the horizontal fixed axis. The movable axis of rotation is pivotable in a vertical plane about the fixed axis with motion of the ball and centered about a horizontal position. An example of this type of ball drive mechanism is disclosed in U.S. Pat. No. 3,056,418 issued to Adams et al. on Oct. 2, 1962. Another ball drive mechanism is known that has the fixed and movable axis in the vice versa position from that of the Adams disclosure. An example of this type of ball drive mechanism is disclosed in U.S. Pat. No. 2,592,062 to Perry on Apr. 8, 1952.

Yet another type of ball valve drive mechanism has the movable axis being substantially perpendicular to the fixed transverse axis and being substantially aligned with the control stem. This type of drive mechanism is disclosed in U.S. Pat. No. 3,417,783 issued to Manoogian on Dec. 24, 1968.

Cartridges for the valve elements and seals have also been commercially popular. Known cartridges have housed the movable and fixed plates. The cartridge can easily be removed and replaced with another in order to effect an easy repair to the faucet. After the water supply is turned off, the faucet is merely opened and the cartridge is easily replaced. This type of repair can be accomplished without the need to call in skilled labor.

Plate valves have often been incorporated into a cartridge format. However, ball valves until recently have not been amenable to a cartridge construction. Firstly, the floating nature of the traditional ball valve demanded that any cartridge completely surround and capture the ball valve, otherwise the ball valve simply falls out of the bottom of the cartridge. Secondly, the compact nature of the ball valve construction leaves little room for the inclusion of a cartridge. The introduction of traditional cartridges that house and capture the ball into the faucet housing demands that the housing be made taller to incorporate the added height needed for the inclusion of the cartridge.

Furthermore, traditional cartridges inhibit repair to worn elastomeric seals. The cartridge houses both the moving valve element and the fixed valve ports which often include the elastomeric port seals. Most of the wear and resulting leakage in a faucet is the result of the repetitive motion of the moving valve element on the elastomeric port seals. Because the seals are encased in the cartridge, the entire cartridge is replaced including the replacement of many good cartridges components that still have long useful life.

Furthermore, many cartridges are permanently assembled and do not permit dismantling.

Even for known cartridges that can be dismantled, the upper part and lower parts are provided with suitable securing or detente elements. Such a cartridge is disclosed in PCT publication WO 95/10725 published on Apr. 20, 1995 for a ball valve that mimics the motion of a plate type mixing. Furthermore, the disclosed mixing valve has a separate top control member that defines the flow and temperature stops for the mixing valve. The temperature stops are located close to the central longitudinal axis of the mixing valve. The closeness of the stops to the longitudinal axis magnifies manufacturing tolerances to render large temperature variations thereby decreasing the accuracy of the calibrated stops.

A cartridge for other types of ball valve drives has recently been developed. This cartridge construction is disclosed in PCT application US95/01612 filed on Feb. 6, 1995.

What is needed is a ball valve cartridge for a mixer valve that seats a ball valve element and can be dismantled to provide access to the elastomeric port seals about the inlet ports without having to provide separate securing or detente elements for the two cartridge body members. What is also needed is a cartridge that has an internal adjustable temperature stop that can provide accurately calibrated stop locations for accurate hot temperature limits.

SUMMARY OF THE DISCLOSURE

In accordance with one aspect of the invention, a faucet mixer valve has a movable ball valve element mounted in a cartridge that in turn is mounted in a housing body that defines a cavity with inlet and outlet ports in communication with the cavity. The cartridge has a housing upper member and housing lower member. The cartridge housing upper member has an upper opening for allowing the control stem passing therethrough. The lower base member has hot and cold supply passages and an outlet passage operably in communication with the inlet and outlet ports in the housing. The ball valve element cooperates with the hot and cold supply passages to control liquid flow in both flow rate and temperature mix through the passages.

The ball valve has first and second projections at substantially diametrically opposite ends of a central equator of the ball valve. The first and second projections extend through opposing apertures in one of the upper and lower housing members and opposing aligned recesses in the other of the upper and lower housing members.

The projections are constructed and mounted to the ball valve for constraining the ball valve pivotable motion about two substantially perpendicular axies of motion. The respective apertures and recesses have a vertical width that is sized to snugly receive the vertical dimension of the projections such that the projections are constrained from substantial vertical motion between the upper and lower housing members. The lower housing member and upper housing member are held together by the two projections extending from the ball valve that also function to constrain the ball valve motion.

Preferably, the projections are the distal ends of a pin that extends through the ball valve. The apertures and recesses in the upper and lower members are horizontally and circumferentially extending guide slots that are aligned to receive the distal ends of the pin and the ball valve is constructed to pivot such that the pin translationally moves along the circumferential slots. The guide slots in one of the upper and lower members are circumferentially shorter than the guide slots in the other of the upper and lower members. The ends of the shorter slots form temperature stops for the bearing pin as it translationally moves to end of the slots.

The pin in one embodiment is slidably inserted through the ball valve and is secured against relative shifting with respect to the cartridge housing along its longitudinal axis when the cartridge is installed within the faucet mixer valve.

In one embodiment, a securing ring is placed in a circumferential groove in the cartridge to provide an outer wall that prevents the pin from axially shifting. Preferably, the circumferential groove is positioned on an outer facing surface of the cartridge housing. The securing ring has a transverse slit such that it can be spread open to disengage from the circumferential groove. Preferably, the securing ring has a inwardly radially extending stop dog which extends into one of the circumferentially extending guide slots and is adjustably positionable in the circumferential direction to adjustably decrease the angle of rotation of the bearing pin between one end of the slots and the dog. In one embodiment, the securing ring has inwardly facing engagement splines and recesses such as splines and interposing grooves that are adjustably engageable to outwardly facing complementary engagement splines and recesses on the cartridge housing.

In accordance with a broader aspect of the invention, a ball valve cartridge for a mixer valve has the above described ball valve element with two protrusions that both constrain motion of the ball valve to two othoganol directions and also interconnect an upper cartridge housing member and a lower cartridge housing member into an assembled mixer valve cartridge housing about the ball valve element.

BRIEF DESCRIPTION OF THE DRAWINGS

Reference now is made to the accompanying drawings in which.

DETAILED DESCRIPTION OF THE PREFERRED EMBODIMENT

Figure 1:
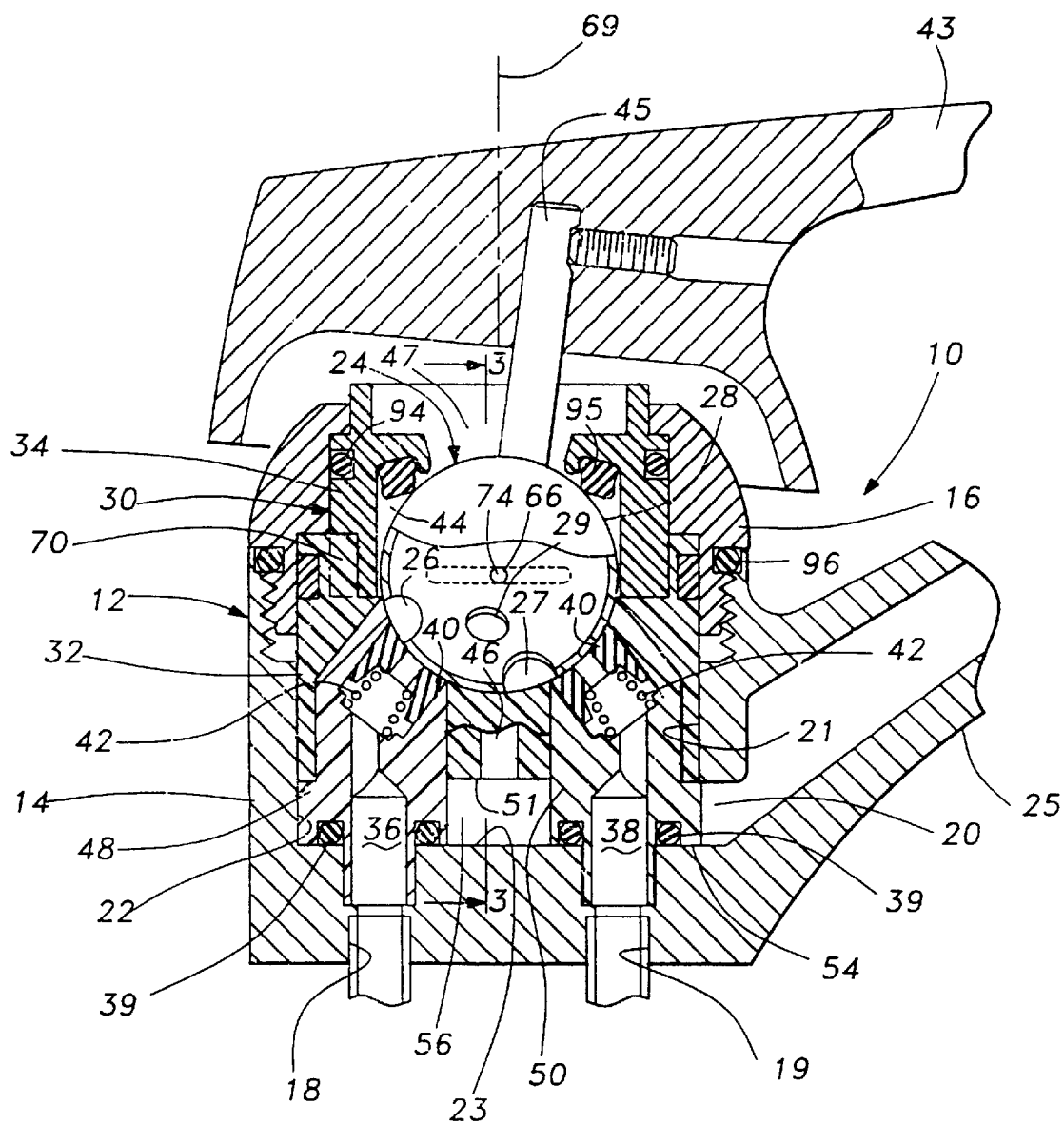
FIG. 1 is a side elevational and segmented view of a mixer valve illustrating one embodiment of the invention.
Figure 2:
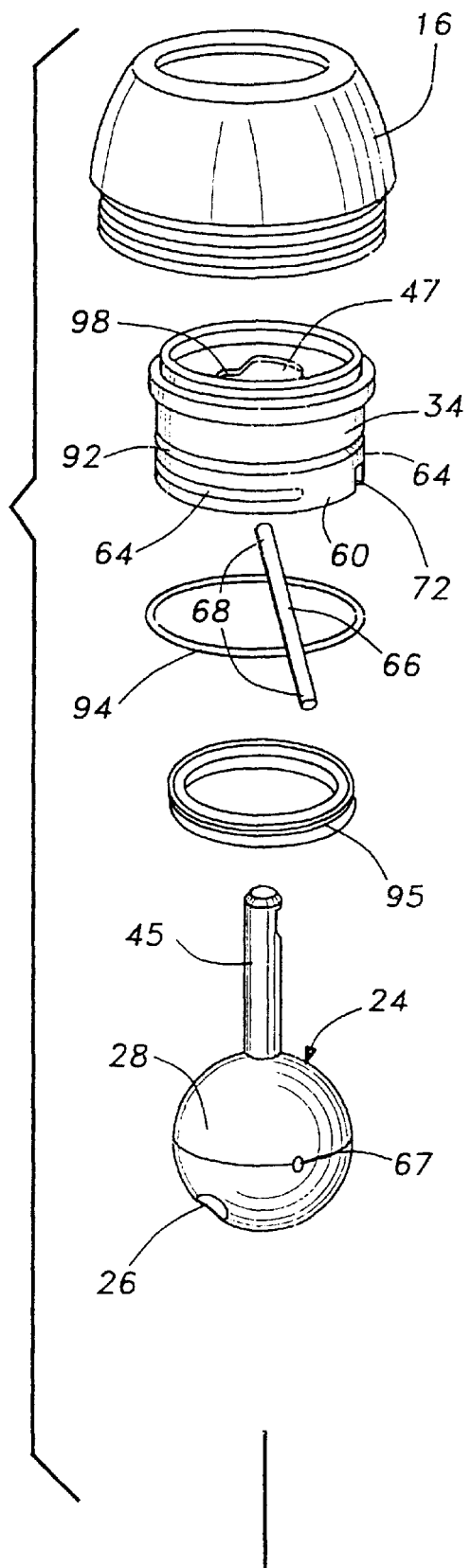
FIG. 2 is an exploded perspective view of the mixer valve shown in FIG. 1.
Figure 2:
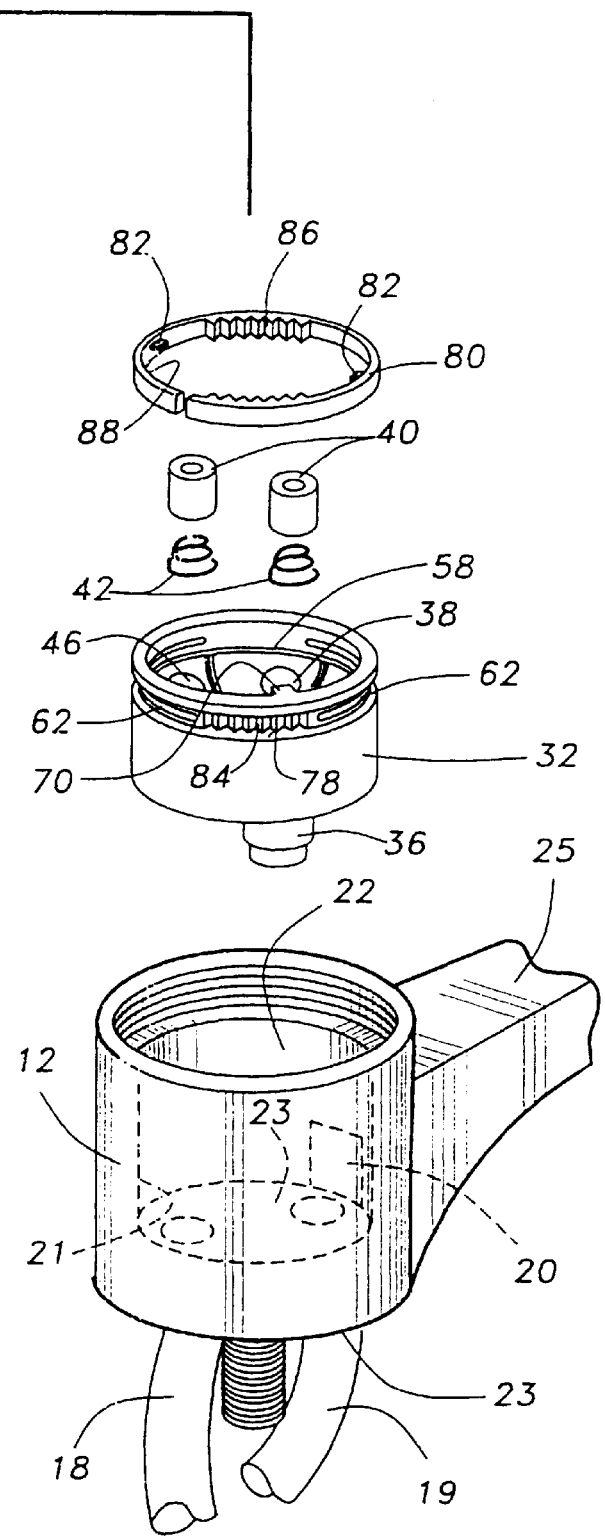

Referring to FIGS. 1 through 4, a mixer valve 10 includes a valve housing 12 that is formed from a lower base member 14 and a cap 16 threadably engageable with the base member 14. The base member 14 has a substantially cylindrical cavity 22 formed therein with two inlet passages 18 and 19 at a flat bottom end 23 for cold and hot water and an outlet passage 20 through a side cylindrical wall 21 leading to a spout member 25. A cartridge housing assembly 30 is fitted within the base member. The cartridge housing assembly contains a ball valve 24 which forms the movable valve element of the mixer valve.

The cartridge housing assembly 30 has a lower housing member 32 and upper housing member 34. The lower housing member 32 has respective stepped inlet ports 36 and 38 that are aligned with inlet passages 18 and 19. The upstream ends of inlet ports 36 and 38 are surrounded by o-rings 39 at the upstream end. O-rings 39 seal up against the flat bottom end 23 to provide a leak free connection between passage 18 and port 36 and between passage 19 and port 38. The downstream ends of ports 36 and 38 are counter-bored to form a seat for two biasing springs 42 which bias tubular elastomeric sealing elements 40 against the ball valve element 24 that is seated into a cavity 44 in the cartridge housing 30.

The ball valve element 24 has a substantially spherical valve surface 28 with cold inlet openings 26, hot inlet openings 27, and outlet opening 29 therethrough. The openings 26 and 27 have their downstream ends appropriately sized, shaped and positioned to provide a desired flow rate and mixing profile with the ports 36 and 38 to regulate the mixture ratio of water and the flow rate, i.e. volume of total water per unit time from the two inlet ports 36 and 38 to the outlet port 46. The outlet port 46 extends downwardly from the recess 44 and through the bottom end 51 of the lower valve housing to be in fluid communication with the outlet passage 20 and spout 25.

A control stem 45 is fixedly connected to the ball valve element 24 and extends through the control opening 47 in the upper housing and cap 16. The control stem 45 is constructed to be attached to a faucet handle 43 in a conventional fashion.

The lower housing member 32 is made from easily molded plastic material. The molding of plastic lower housing member 32 provides for an expeditious method to make the bent and inclined inlet ports 36 and 38. The lower housing member 32 may have two valve inserts 48 and 50 which contain the ports 36 and 38 and seat the springs 40 and seal elements 42. The lower end of each insert is stepped with a shoulder 54 to house a seal ring 52 that provide a leak proof connection between the passages 18 and 19 with respect the ports 36 and 38 respectively. The bottom end of outlet port 46 is spaced above the flat bottom end 23 of the cavity 22 such that an outlet chamber 56 is formed about the stepped shoulders 54 and in communication with the outlet passage 20.

The lower valve housing member 32 has an upper end with an internal stepped shoulder 58 that receives the bottom end 60 of the upper housing member 34. The stepped shoulder section has two circumferentially extending and diametrically opposing slots 62 therethrough that are aligned with two circumferentially extending and diametrically opposing slots 64 through the upper housing member 34.

The ball valve 24 received in the recess 44 in the cartridge housing has a cylindrical guide pin 66 extending horizontally therethrough. Holes 67 in the ball valve are sized to slidably receive the pin 66. The guide pin has distal ends 68 that extend beyond the exterior valving surface 68 of the ball valve 24 and through the slots 64 and into slots 62. The pin 66 is positioned to intersect the center 74 of ball valve 24 and lie perpendicular to control stem 45 as clearly shown in FIG. 3.

The lower and upper housing members are positioned nonrotatably relative to one another by interengaging indexing structure. The lower housing member 32 has a vertical spine 70 that is received in corresponding vertical groove 72 in the upper housing member 34 to correctly orient the rotational position of the two housing members when assembled together.

The cylindrical guide pin 66 allows the ball valve to rotate about the axis of the pin. The transveral rotational motion of the guide pin through the slots 62 and 64 allow the ball to pivot about a vertical central axis 69. The slots 62 and 64 are vertically dimensioned to form only enough clearance to allow sliding movement of the pin ends 68 in slots 62 and 64. Desirably no vertical spacing exists between slot 62 and 64 and the ends 68.

Figure 4:
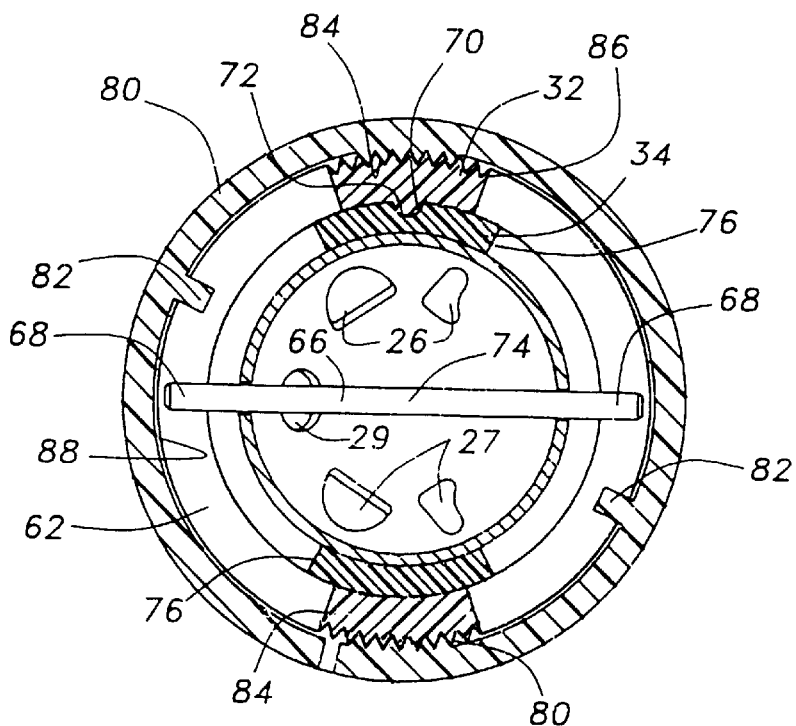
FIG. 4 is a fragmentary cross-sectional view of the taken along line 4–4 shown in FIG. 3.

The guide slots 62, 64 in one of the two cartridge housing members 32 and 34 may have a shorter circumferential length than the guide slots in the other housing member. As shown in FIG. 4, the end shoulder 76 of slot 64 forms the cold stop position of the ball valve 24.

The hot stop position is adjustable. Lower housing member has a external circumferential groove 78 which receives a split ring member 80 made from a resilient but rugged plastic material that is suitable for faucet applications. The ring member 80 has two opposing dog legs 82 which protrude into slots 62 and can abut distal ends 68 of pin 66 and limit motion of the pin 66. The ring is adjustably mounted onto the lower housing member 32. The groove 78 is provided with a series of splines or external vertical extending teeth 84 which adjustably engage complementary internal teeth or spines 86 on the ring 80. In this fashion the position of dog legs 82 within the slots 62 can be adjustably fixed to provide adjustment to the hot stop position of the ball valve 24 by mere expansion of the ring to disengage from the teeth 84 in groove 78.

Figure 3:
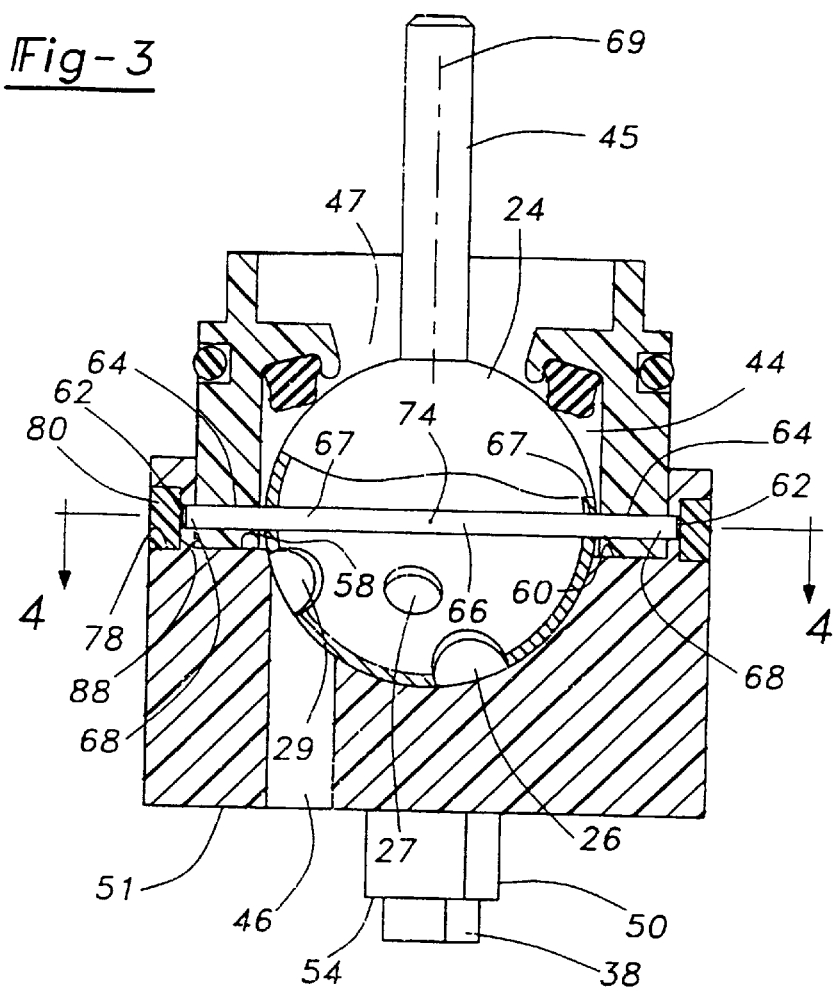
FIG. 3 is a partially cross-sectional view of the cartridge member taken along line 3—3 shown in FIG. 1.

Furthermore, the inside wall 88 of the ring 80 lies in proximity to the distal ends 68 of pin 66 to provide an outer abutment wall to slot 62. As shown in FIGS. 3 and 4, lateral axial shifting of the pin 66 within the ball is limited to assure the proper axial position of the pin within the ball valve 24 and cartridge housing 30.

The outer periphery 90 of the cartridge housing member 34 has an annular groove 92 which seats an O-ring 94 that provides for proper sealing against the cap 16. A sealing gasket 95 is positioned within the upper housing member to provide a seal between the ball valve 24 and the cartridge housing 30. An o-ring 96 is provided between the cap 16 and lower base 14 to provide a water seal therebetween.

The upper control opening 47 within upper housing also has circumferential edges 98 that control the extent of rocking motion about axis of pin 66 from the off position to the full on position respectively.

Assembly of the faucet can be accomplished manually with no special tools needed. Furthermore, the parts are suitable for automated assembly. The cartridge housing 30 is assembled with the gasket 95, o-ring 94, springs 40 and seal elements 42 properly seated. Ball valve element 24 is then positioned against gasket 95. The lower housing is then slid in place with respect to upper housing capturing the ball valve 24 therein. The pin 66 is then passed through the slots 62 and 64 and through the holes 67 in ball surface 29. The split ring 80 is then placed in the desired position within groove 78. The assembled cartridge 30 is a self contained assembly that can be sold separately as a repair replacement for late reinstallation into the faucet mixer valve 10.

The assembled cartridge 30 is placed in cavity 22 of the faucet base member 14. The valve inserts 48 and 50 are seated in the passages 18 and 19 to properly orient the cartridge in the cavity 22. The shoulder 54 properly vertically positions the cartridge 30 within the cavity 22. Cap 16 is then threaded onto the lower base member 14 and handle 43 is properly mounted.

When repairs to or replacement of the elastomeric seals 42 are needed, the handle 43 and cap 16 are removed and cartridge 30 is axially lifted out of the lower base member. The split ring 80 is disengaged and the pin 66 can be removed to dismantle the cartridge and provide access to seal elements 42. The seal elements 42 and springs 40 can then be removed and or replaced. After repairs or replacement, the cartridge 30 is reassembled and installed back into the faucet housing 12.

Figure 6:
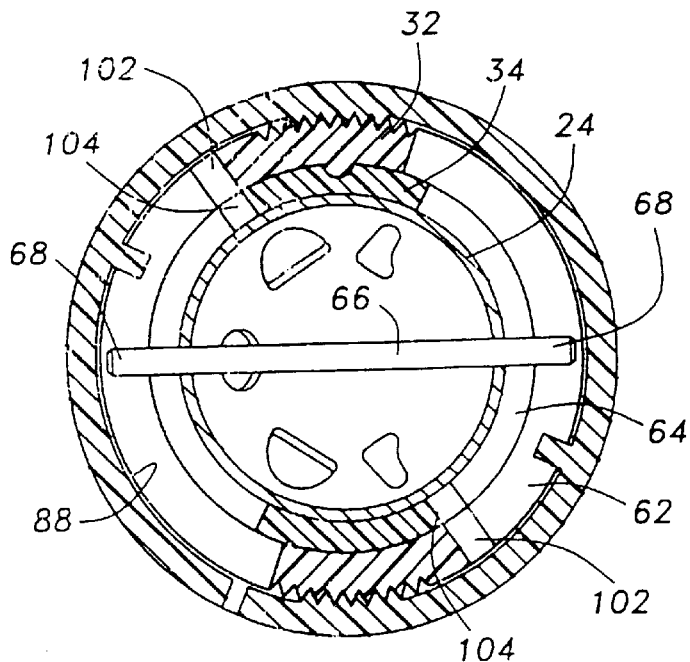
FIG. 6 is a cross sectional plan view similar to FIG. 4 illustrating the second embodiment.
Figure 5:
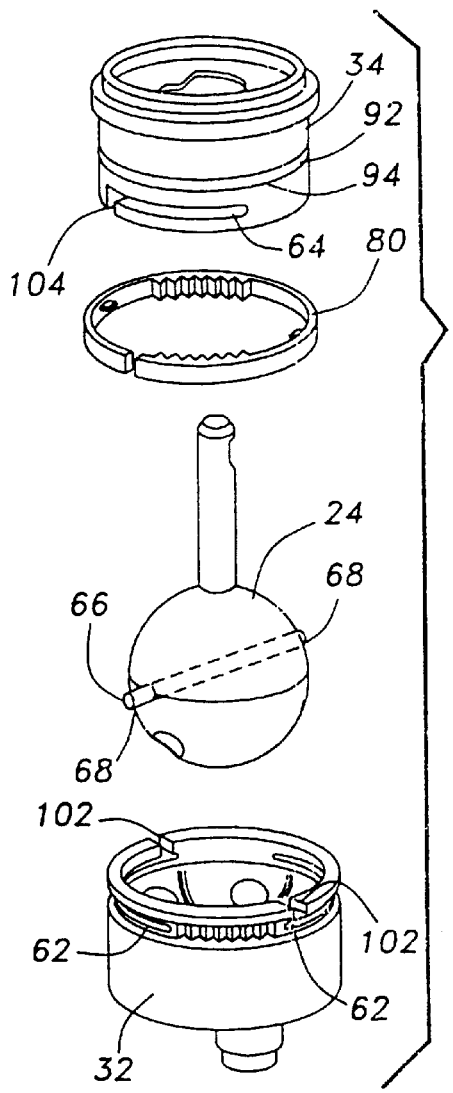
FIG. 5 is an exploded perspective view of a second embodiment of a mixer valve cartridge assembly.

In a second embodiment, as shown in FIGS. 5 and 6, similar parts to parts described for the first embodiment have the same numerals. Lower housing member 32 is provided with a vertical slit 102 at one end of each slot 62 that extends to upper end of shoulder section 54. Upper housing 34 is provided with a downwardly extending slit 104 that extends from one end of each slot 64. The ball valve 24 is provided with a pin 66 that is permanently pre-welded in place with distal ends 68 projecting therefrom. For assembly of the cartridge 30, the springs and sealing elements are properly positioned as in the first embodiment. The ball valve is then placed in each housing member 32 and 34 by having distal ends 68 inserted laterally through the slits 102 and 104. The ball valve is then rotated such that the distal ends 68 become misaligned with slits 102 and 104 as shown more clearly in FIG. 6. The split ring 80 is then positioned in place within groove 78 as more clearly shown in FIG. 6. As long as the split ring in position, the dog legs 82 prevent the distal ends 68 from becoming realigned with the vertical slits 102 and 104 and the cartridge remains assembled. The other function of the split ring such as providing an adjustable hot stop as in the first embodiment remain the same.

A modification of this embodiment may replace the pin 66 by two separate projections 68 that are welded in place on diametrically opposite positions on the ball valve.

Figure 7:
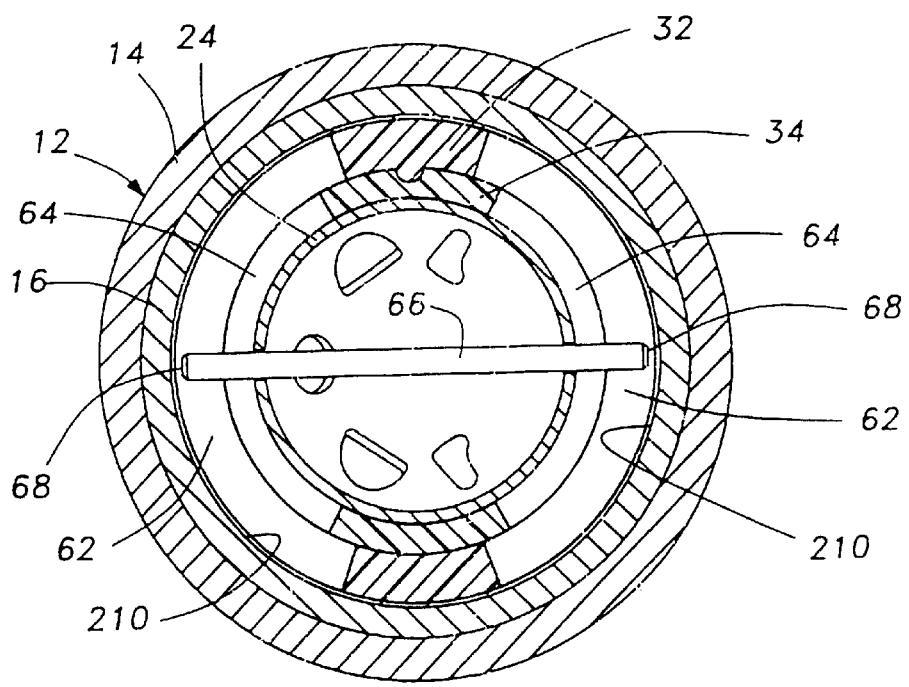
FIG. 7 is a view similar to FIG. 4 illustrating a third embodiment of the invention.

A third embodiment is shown in FIG. 7 which does not have a split ring. Instead the pin is dimensioned to extend to the outer diameter extent of slot 62 and the cap 16 has its internal wall 210 provide axial restraint of the pin to maintain its proper axial position.

Figure 8:
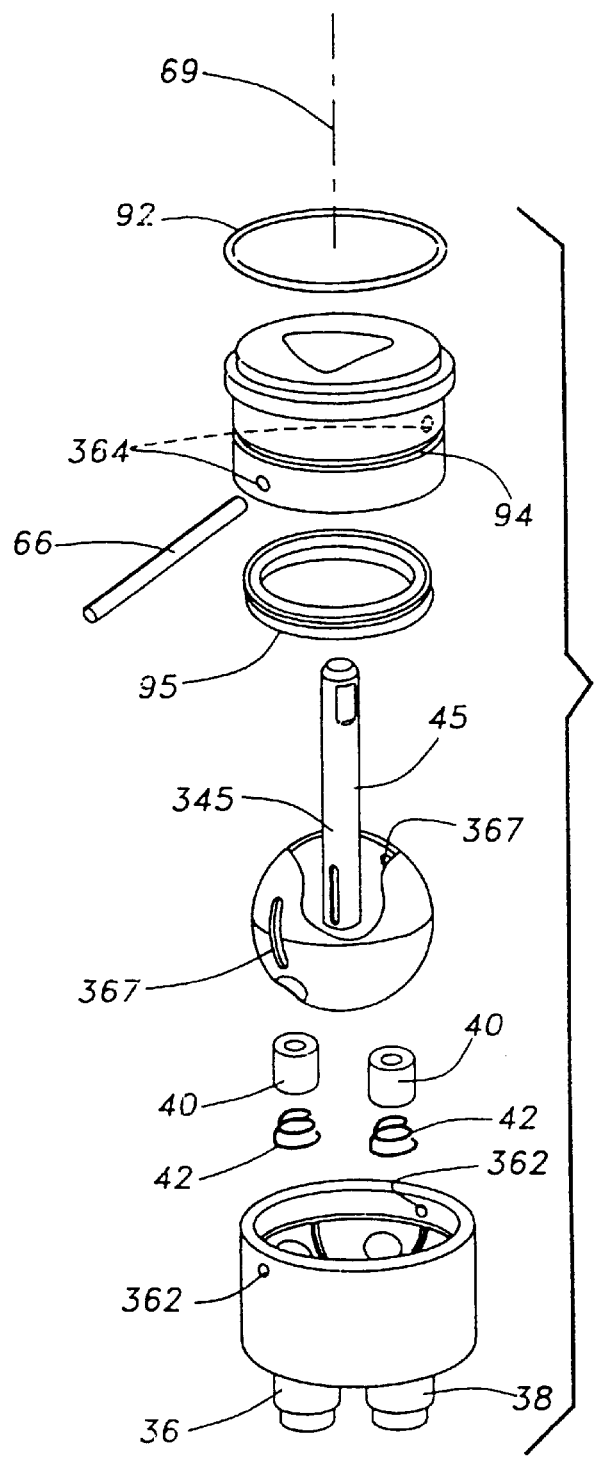
FIG. 8 is an exploded perspective view of a fourth embodiment of a mixer valve cartridge assembly.
Figure 9:
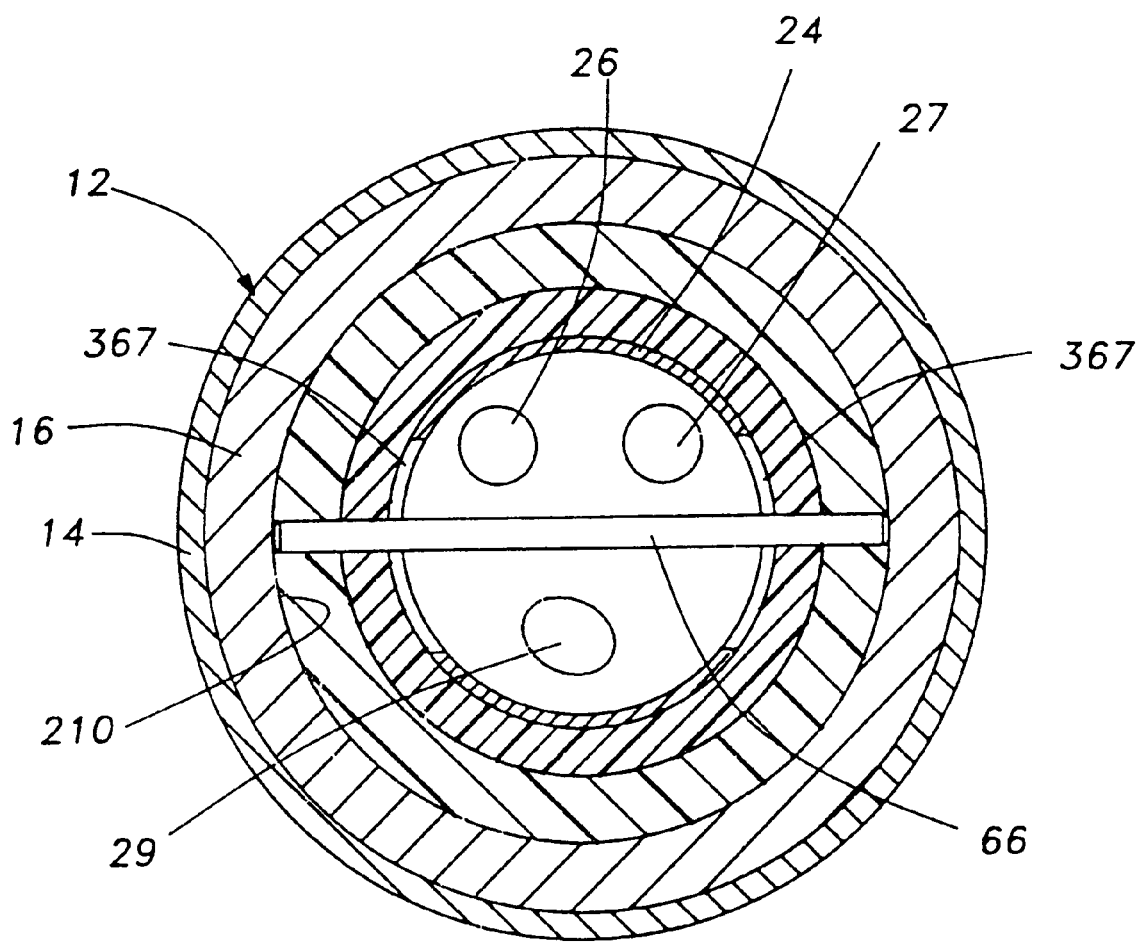
FIG. 9 is a view similar to FIG. 4 illustrating the fourth embodiment.

With reference to FIGS. 8 and 9, the pin 66 can also be used to assemble the cartridge 30 for ball valve mechanisms that have alternative types of valving action. As shown in the figures, the slots 62 and 64 have been replaced with apertures 362 and 364. The ball valve 24 has its apertures 67 replaced with diametrically opposite slots 367. The angle of the slots 367 determine the operation parameters of the drive or valving action. One alternative type of valving action occurs if the slot is vertically oriented where the plane of the slot intersects the end of the handle 45, as illustrated in FIG. 8. The stem 45 may have a protrusion 345 extending within the ball to properly vertically position the ball with respect to seal gasket 95. A second alternative type of valving action is achieved if each slot 367 is positioned perpendicular with respect to the control stem 45 and placed in a near horizontal position within the cartridge as illustrated in FIG. 9.

The inlet ports 36 and 38, inlet opening 26 and 27, outlet opening 29 and outlet ports 46 are appropriately position for these alternative types of valving action.

In either case, the pin 66 is fixed within cartridge 30 such that it does not move about the vertical axis 69. It also is fixed from axial shifting due to the proximity of the internal wall 210 of cap member 16 as shown in FIG. 9. The ball valve however retains two degrees of motion, one being pivotal motion about the axis of the pin and the other being about an axis that is perpendicular to the plane of the slots 367.

The pin 66 however still functions to both assemble the lower housing member 32 and upper housing member 34 with the ball valve 24 and to constrain the ball valve motion to two orthogonal directions.

In this fashion, a cartridge assembly for a ball valve is structured such that the pin which constrains the degrees of motion of the ball valve also functions to retain the cartridge assembly together. The structure can be used with all of the known types of valving action for a ball valve.

Other variations and modifications are possible without departing from the scope and spirit of the present invention as defined by the appended claims.

The embodiments in which an exclusive property and privilege is claimed is defined as follows:

1. In a faucet mixer valve having a movable ball valve element mounted in a cartridge that in turn is mounted in housing body that defines a cavity, said cartridge having a housing upper member and housing lower member, said cartridge housing upper member having an upper opening for allowing said control stem passing therethrough, said lower base member having hot and cold supply passages and an outlet passage, said ball valve element cooperating with said hot and cold passages to control liquid flow in both flow rate and temperature mix through said passages, said ball valve body having a control opening therethrough, said valve element having a control stem connected thereto and extending through said control opening; the improvement characterized by:

said ball valve having first and second projections at substantially diametrically opposite ends of a central equator of the ball valve;

said first and second projections extending through opposing apertures in one of said upper and lower housing members and opposing recesses in the other of said upper and lower housing members such that said lower housing member and upper housing member held together by the two projections extending from the ball valve;

said projections being constructed and mounted to the ball valve for constraining pivotable motion of the ball valve about two substantially perpendicular axes of motion; and said respective apertures and recesses having a vertical width that is sized to snugly receive the vertical dimension of the projections such that the projections are constrained from substantial vertical motion between the upper and lower housing members.

2. A faucet mixer valve as defined in claim 1 further characterized by:

said projections being the distal ends of a pin that extends through the ball valve.

3. A faucet mixer valve as defined in claim 2 further characterized by:

said apertures and recesses in said upper and lower members being horizontally and circumferentially extending guide slots that are aligned to receive the distal ends of the pin and the ball valve is constructed to pivot such that the pin translationally moves along the circumferential slots.

4. A faucet mixer valve as defined in claim 3 further characterized by:

said guide slots in one of the upper and lower members being circumferentially shorter that the guide slots in the other of the upper and lower members and the ends of the shorter slots forming temperature stops for the bearing pin as it translationally moves within said slots.

5. A faucet mixer valve as defined in claim 4 further characterized by:

said pin being slidably inserted through said ball valve and being secured against relative shifting with respect to the cartridge housing along its longitudinal axis when said cartridge is installed within said faucet mixer valve.

6. A faucet mixer valve as defined in claim 5 further characterized by:

a securing ring surrounding the cartridge housing and placed in a circumferential groove in the cartridge to provide a outer wall that prevents the pin from axially shifting.

7. A faucet mixer valve as defined in claim 6 further characterized by:

said circumferential groove being positioned on an outer facing surface of the cartridge housing;

said securing ring having a transverse slit such that it can be spread open to disengage from the circumferential groove.

8. A faucet mixer valve as defined in claim 6 further characterized by:

said securing ring having an inwardly radially extending stop dog which extends into at least one of the circumferentially extending guide slots and is adjustably positionable in the circumferential direction to decrease the angle of rotation of the bearing pin between one end of the slots and the dog.

9. A faucet mixer valve as defined in claim 8 further characterized by:

said securing ring having inwardly facing engagement protrusions and recesses being adjustably engageable to outwardly facing complementary engagement protrusions and recesses to be affixed against rotation.

10. A ball valve cartridge for a mixer valve having a ball valve element having at least one inlet and an outlet, said cartridge having a housing upper member having an upper opening, said ball valve element having a control stem connected thereto and extending through said upper opening, said lower base member having hot and cold supply ports and an outlet passage, said ball valve element cooperating with said hot and cold supply ports to control liquid flow in both flow rate and temperature mix through said supply ports, the improvement characterized by:

said ball valve having first and second projections at substantially diametrically opposite ends of a central equator of the ball valve;

said first and second projections extending through opposing apertures in one of said upper and lower housing members and opposing recesses in the other of said upper and lower housing members such that said lower housing member and upper housing member are held together by the two projections extending from the ball valve;

said projections being constructed and mounted to the ball valve for constraining pivotable motion of the ball valve about two substantially perpendicular axies of motion; and said respective apertures and recesses having a vertical width that is sized to snugly receive the vertical dimension of the projections such that the projections are constrained from substantial vertical motion between the upper and lower housing members.

11. A ball valve cartridge as defined in claim 10 further characterized by:

said projections being the distal ends of a pin that extends through the ball valve.

12. A ball valve cartridge as defined in claim 11 further characterized by:

said apertures and recesses in said upper and lower members being horizontally and circumferentially extending guide slots that are aligned to receive the distal ends of the pin and the ball valve is constructed to pivot such that the pin translationally moves along the circumferential slots.

13. A ball valve cartridge as defined in claim 12 further characterized by:

said guide slots in one of the upper and lower members being circumferentially shorter that the guide slots in the other of the upper and lower members and the ends of the shorter slots forming temperature stops for the bearing pin as it translationally moves within said slots.

14. A ball valve cartridge as defined in claim 13 further characterized by:

said pin being slidably inserted through said ball valve and being secured against relative shifting with respect to the cartridge housing along its longitudinal axis when said cartridge is installed within a faucet mixer valve.

15. A ball valve cartridge as defined in claim 14 further characterized by:

a securing ring surrounding the cartridge housing and placed in a circumferential groove in the cartridge to provide a outer wall that prevents the pin from axially shifting.

16. A ball valve cartridge as defined in claim 15 further characterized by:

said circumferential groove being positioned on an outer facing surface of the cartridge housing;

said securing ring having a transverse slit such that it can be spread open to disengage from the circumferential groove.

17. A ball valve cartridge as defined in claim 15 further characterized by:

said securing ring having a inwardly radially extending stop dog which extends into at least one of the circumferentially extending guide slots and is adjustably positionable in the circumferential direction to decrease the angle of rotation of the bearing pin between one end of the slots and the dog.

18. A ball valve cartridge as defined in claim 17 further characterized by:

said securing ring having inwardly facing engagement protrusions and recesses being adjustably engageable to outwardly facing complementary engagement protrusions and recesses to be affixed against rotation.

* * * * *